July 25, 1933.                  O. A. ROSS                    1,919,344
                    PROPULSION AXLE FOR MOTOR VEHICLES
                           Filed Aug. 9, 1928
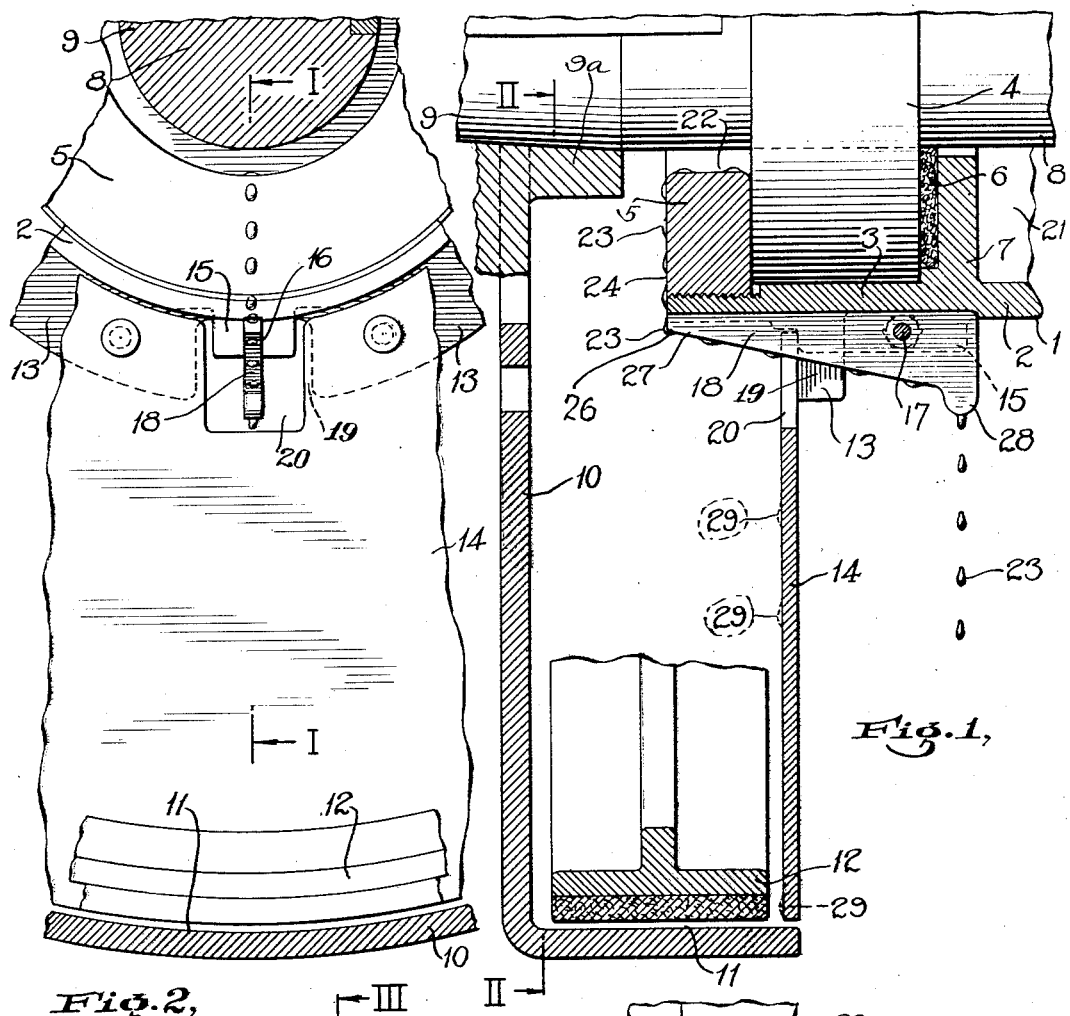
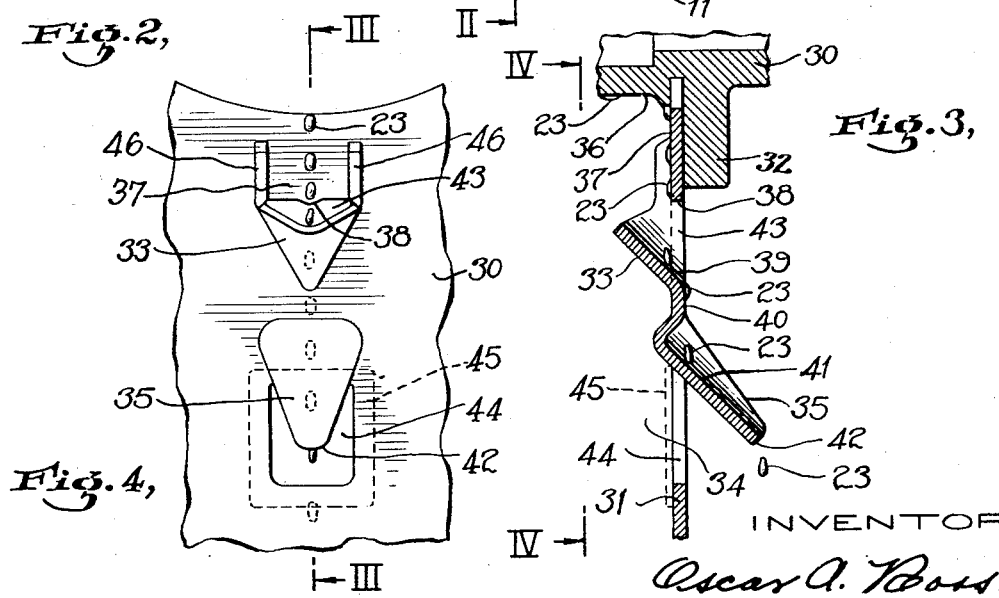
INVENTOR
Oscar A. Ross.

Patented July 25, 1933

1,919,344

UNITED STATES PATENT OFFICE

OSCAR A. ROSS, OF NEW YORK, N. Y.

PROPULSION AXLE FOR MOTOR VEHICLES

Application filed August 9, 1928. Serial No. 298,440.

This invention refers to vehicle axles and more particularly to that class wherein lubricated driving mechanism is contained within a housing for the support thereof.

Rear axles for propelling automobiles or similar vehicles comprise fundamentally a housing, having tubular extensions supporting brake bands arranged to engage the brake drums forming part of driving wheels secured to driving axles rotatably supported within and extending beyond the said extensions and said axles are usually supported in bearings adjacent the brake bands. The housing is supplied with a liquid lubricant for lubricating the axle driving mechanism, and to prevent this lubricant from escaping where the axles pass through the housing, suitable packing washers are inserted, however inasmuch as the packing is stationary and acts to pack against the rotating axle, wear of the packing often permits leakage of the lubricant which in escaping flows onto the brake bands and brake drums, resulting in faulty braking of the vehicle to which said brakes are attached. One object of this invention is to provide simple means, whereby any leakage of lubricant as hereinbefore described, will be diverted to the exterior of the axle before reaching the brake mechanism.

Other objects and advantages will appear as the description of the invention progresses and the novel feature of the invention will be pointed out in the appended claims.

This invention consists in the novel construction and arrangement of parts hereinafter described, delineated in the accompanying drawing, and particularly pointed out in that portion of this instrument wherein patentable novelty is claimed for certain and peculiar features of the apparatus, it being understood that, within the scope of what hereinafter thus is claimed, divers changes in the form, proportions, size and minor details of the structure may be made without departing from the spirit of, or sacrificing any of the details of the invention.

In describing the invention in detail, reference is had to the accompanying drawing, wherein I have illustrated embodiments of my invention, and, wherein like characters of reference, designate corresponding parts throughout the several views, and in which:—

Figure 1 is a part-sectional part plan view of one embodiment of the invention and is taken on line I—I of Fig. 2, and Fig. 2 is a part plan part sectional view of the same taken on line II—II of Fig. 1, and Fig. 3 is a sectional view of a modified form of the invention and is taken on line III—III of Fig 4, and Fig. 4 is a plan view of the same taken on line IV—IV of Fig. 3.

Referring to Figs. 1 and 2, showing a fragment of a known form of rear axle unit 1, to which applicant's improvement has been attached, axle housing 2 comprises bearing seat portion 3, supporting bearing 4 allocated by adjusting nut 5 which locks the outer race thereof against shoulder 7, packing 6 normally acting to prevent leakage of lubricant from interior 21 of said housing. Bearing 4 rotatably supports axle 8 to the taper extension 9 of which the wheel hub 9a is attached said hub being arranged to support, in known manner, brake drum 10 having braking surface 11 arranged to receive impingement of brake shoe 12, said shoe being supported by extensions (not shown) formed on housing 2, said extensions having stationary and movable studs for supporting said brake shoe in known manner.

Formed on housing 2 is flange 13, arranged to support annular protecting or backing plate 14, said plate acting to prevent foreign matter from fouling the brake mechanism within the brake drum 10.

Formed on housing 2 is bifurcated lug 15 having slot 16 in which is secured, as for example by rivet 17, the drip plate 18.

Flange 13 is formed with a notch 19 and a similar notch 20 is formed in the plate 14 said notches acting to form a passage way for drip plate 18.

*Operation*

The operation is as follows:—Any lubricant escaping from interior 21 of the housing 2, flows over the inner face 22 of nut 5, and for more clear illustration, is shown as drops 23—23, said lubricant flowing down the face 24 of said nut to the apex 26 of drip plate 18, as shown, thence flowing downwardly along inclined surface 27 to the discharge lug 28 from whence it falls to the ground, or roadway in this manner preventing fouling of the brake mechanism within the brake drum 10. If applicant's improved lubricant diverting system were not attached to rear axle unit 1 the escaping lubricant 23 would flow as shown by drop 29—29 to the inner face 11 of brake drum 10 covering this surface, and, as the brakes 12 were applied, would be also communicated thereto resulting in defective braking of the vehicle to which said axle unit was attached.

Referring to Figs. 3 and 4, showing a modified form of lubricant diversion device, arranged to be attached to any standard rear axle unit, as 30, without modification thereof other than the protecting plate 31, similar in function therefore to plate 14, said plate 31 is suitably secured to flange 32 of axle unit 30 and has formed therein, preferably by stamping, a trough portion 33 extending inwardly into the brake drum compartment 34. Plate 31 has also formed therein in similar manner another trough 35, extending outwardly and arranged below the upper trough 33.

The operation is as follows:—The escaping lubricant 23 after leaving face 24 of nut 5 flows along the under surface 36 of axle unit 30, as shown, thence flowing between guides 46—46 along surface 37 of plate 31 to apex 38 from whence it falls into surface 39 of trough 33 and thence along surface 40 between said troughs to surface 41 of trough 35 and thence to the apex 42 of said trough from whence it falls to the ground or roadway.

The forming of trough 33 provides orifice 43 permitting transfer of the escaped lubricant from the inside to the outside of brake drum compartment 34 and the forming of trough 35 provides an orifice 44 which may, if desired be covered by a plate, as 45 suitably secured to plate 31.

If desired the orifice 43 may be formed separately and the troughs 33 and 35 may be formed as separate members and suitably secured to plate 31 in which case orifice 44 would be omitted as well as plate 45 therefor.

What I claim is:—

1. The combination with a propelling axle unit for motor vehicles having open ended brake mechanism supporting extensions, of propelling axles extending through the opening therein arranged to support propelling wheels on the protruding ends thereof, the wheels supporting brake drums whereby a space is formed between the drums and the opening of the extensions, bearings supported by the extensions for rotatably supporting the axles whereby lubricant from the housing of the unit may leakably escape therepast to the openings, guard members supported by the extensions for preventing foreign matter from entering the interior of the brake drums positioned in the path of the leaking lubricant flowing from the opening, the lubricant flowing downwardly on the inner side of the members toward the braking surfaces of the drums, and means supported by the guard members independently of the extensions arranged in the path of the leaking lubricant arranged to redirect the flow thereof to the exterior of the members whereby no lubricant will flow onto the brake drums.

2. The combination with a propelling axle unit for motor vehicles having open ended brake mechanism supporting extensions thereon, of propelling axles extending through the openings therein arranged to support propelling wheels on the protruding ends thereof, the wheels supporting brake drums whereby a space is formed between the drums and the opening of the extensions, bearings supported by the extensions for rotatably supporting the axles whereby lubricant from the housing of the unit may leakably escape therepast to the openings, guard members supported by the extensions for preventing foreign matter from entering the interior of the brake drums positioned in the path of the leaking lubricant, the lubricant flowing downwardly on the inner surfaces thereof toward the braking surface of the brake drums, and means positioned solely below the space arranged in the path of the leaking lubricant for effecting a redirection of the flow thereof to the exterior of the member whereby no lubricant will flow to the brake drums.

3. The combination with a propelling axle unit for motor vehicles having open ended brake mechanism supporting extensions thereon, of propelling axles supported thereby extending through the openings therein arranged to support propelling wheels on the protruding ends thereof, the wheels supporting brake drums whereby a space is formed between the drums and the opening of the extensions, bearings supported by the extensions for rotatably supporting the axles whereby lubricant from the housing of the unit may leakably escape therepast to the openings, guard members supported by the extensions for preventing foreign matter from entering the interior of the brake drums positioned in the path of the leaking lubricant, the lubricant flowing downwardly on the inner surfaces thereof toward the braking surfaces of the brake drums, and lubricant directing surfaces positioned solely below the openings of the extensions arranged in the path of the leaking lubricant for effecting a redirection of the flow thereof to the exterior of the member whereby no lubricant will flow to the brake drums.

4. The combination with a propelling axle unit for motor vehicles having open ended brake mechanism supporting extensions thereon, of propelling axles supported thereby extending through the openings arranged to support propelling wheels on the protruding ends thereof, the wheels supporting brake drums adjacent the openings, bearings supported by the extensions for rotatably supporting the axles whereby lubricant from the housing of the unit may leakably escape therepast to the openings, guard members supported by the extensions for preventing foreign matter from entering the interior of the brake drums positioned in the path of the leaking lubricant, the lubricant flowing downwardly on the inner surfaces thereof toward the braking surfaces of the brake drums, and means supported wholly below the openings of the extensions arranged in the path of the leaking lubricant for redirecting the flow thereof to the exterior of the member whereby no lubricant will flow to the braking surfaces.

5. The combination with a propelling axle unit for motor vehicles having open ended brake mechanism supporting extensions thereon, of propelling axles supported thereby extending through the openings arranged to support propelling wheels on the protruding ends thereof, the wheels supporting brake drums adjacent the openings of the extensions, bearing supported by the extensions for rotatably supporting the axles whereby lubricant from the housing of the unit may leakably escape therepast to the openings, and thence downwardly toward the braking surfaces of the brake drums, and means supported wholly below the openings of the extensions arranged to receive the leaking lubricant and redirect the flow thereof remote from the brake drums whereby no lubricant will flow to the braking surfaces thereof.

6. The combination with a propelling axle unit for motor vehicles having a housing, the housing having open ended brake mechanism extensions thereon, of propelling axles supported thereby extending through the openings arranged to support propelling wheels on the protruding ends thereof, the wheels supporting brake drums adjacent the openings, bearings supported by the extensions for rotatably supporting the axles whereby lubricant from the housing may leakably escape therepast to the openings, guard members supported by the extensions for preventing foreign matter from entering the interior of the brake drums positioned in the path of the leaking lubricant, the lubricant flowing downwardly on the inner surfaces thereof toward the braking surfaces of the brake drums, and an inwardly extending intercepting member supported wholly by the guard member arranged to receive the leaking lubricant for redirecting the flow thereof to the exterior thereof whereby no lubricant will flow to the braking surfaces of the brake drums.

7. A guard for protecting brake mechanism associated with brake drums of motor vehicles which comprises, a disk member having a centrally disposed orifice therein, a trough portion formed therein on one side thereof positioned between the orifice and the periphery thereof, and an orifice formed in the member positioned adjacent the trough portion, the orifice being formed by the forming of the trough portion whereby one end of the trough will communicate with one side of the member and the other end of the trough will communicate with the other side of the member.

8. A guard for protecting brake mechanism associated with brake drums of motor vehicles which comprises, a disk member having a centrally disposed orifice therein, trough portions formed on opposite sides thereof positioned between the orifice and the periphery thereof, orifices formed in the member positioned adjacent the trough portions, the orifices being formed by the forming of the trough portions whereby the discharge end of the trough on one side of the member will communicate with the receiving end of the trough on the other side of the member, the communication therebetween being effected through one of the orifices formed by the forming of the trough portions.

9. A guard for protecting brake mechanism associated with brake drums of motor vehicles which comprises, a metal disk member having a centrally disposed orifice therein, trough portions formed on opposite sides thereof positioned substantially on a radial line between the orifice and the periphery thereof, irregular orifices formed in the member positioned adjacent the trough portions, the irregular orifices being formed by the forming of the trough portions from the body of the member whereby the discharge end of the trough on one side of the member will communicate with the receiving end of the trough on the other side of the member, the communication therebetween being effected through one of the irregular orifices formed by the forming of the trough portions.

10. A guard for protecting brake mechanisms associated with the brake drums of motor vehicles which comprises, a metal disk member having a centrally disposed orifice therein, a radially disposed trough portion formed therein on one side thereof positioned between the orifice and the periphery thereof, and an orifice formed in the member positioned adjacent the trough portion, the orifice being formed by the forming of the trough portion from the body of the member whereby one end of the trough will communicate with one side of the member and the other end of the trough will communicate with the other side of the member through the orifice adjacent thereto.

OSCAR A. ROSS.